US008505603B2

(12) United States Patent
Bordoz

(10) Patent No.: US 8,505,603 B2
(45) Date of Patent: Aug. 13, 2013

(54) VEHICLE HAVING TIRES WITH REINFORCED SIDEWALLS

(75) Inventor: Francis Bordoz, Clermont-Ferrand (FR)

(73) Assignees: Michelin Recherche et Technique S.A., Granges-Paccot (CH); Compagnie Generale des Etablissements Michelin, Clermont-Ferrand (FR)

(*) Notice: Subject to any disclaimer, the term of this patent is extended or adjusted under 35 U.S.C. 154(b) by 429 days.

(21) Appl. No.: 12/742,967

(22) PCT Filed: Nov. 13, 2008

(86) PCT No.: PCT/EP2008/065484
§ 371 (c)(1),
(2), (4) Date: Sep. 13, 2010

(87) PCT Pub. No.: WO2009/063012
PCT Pub. Date: May 22, 2009

(65) Prior Publication Data
US 2011/0011510 A1    Jan. 20, 2011

(30) Foreign Application Priority Data

Nov. 14, 2007   (FR) ...................................... 07 59030

(51) Int. Cl.
*B60C 9/00* (2006.01)
*B60C 15/00* (2006.01)

(52) U.S. Cl.
USPC ............................ 152/555; 152/450; 152/539

(58) Field of Classification Search
USPC .......................................... 152/450, 555, 539
See application file for complete search history.

(56) References Cited

FOREIGN PATENT DOCUMENTS

| EP | 0 483 710 | | 5/1992 |
|----|-----------|---|---------|
| JP | 59-73307 | * | 4/1984 |
| JP | 4-24102 | * | 1/1992 |
| JP | 2567836 | * | 12/1996 |
| JP | 10-157408 | * | 6/1998 |
| JP | 2001 121928 | | 5/2001 |
| JP | 2003 320821 | | 11/2003 |
| JP | 2004 130859 | | 4/2004 |
| JP | 2001-138706 | * | 5/2004 |

OTHER PUBLICATIONS

Machine translation of JP 10-157408, 1998.*
Machine translation of JP 2001-121928, 2001.*

* cited by examiner

*Primary Examiner* — Justin Fischer
(74) *Attorney, Agent, or Firm* — Cozen O'Connor

(57) ABSTRACT

A vehicle of motorcycle type comprising at least two axle systems each equipped with a mounted assembly consisting of a wheel and a tire. Each of the tires comprises, in each sidewall, at least one additional layer of reinforcing elements forming with the circumferential direction an angle of between 20° and 60°, the orientation of the reinforcing elements of the additional layer in a sidewall being symmetrical to the orientation of the reinforcing elements of the additional layer in the other sidewall in relation to the equatorial plane, the angle formed by the plane comprising a reinforcing element of an additional layer with a radial plane comprising the radially inner end of said reinforcing element being oriented in the direction of rotation of the mounted assembly corresponding to the forward movement of the vehicle in the rear tire and in the opposite direction in the front tire.

12 Claims, 3 Drawing Sheets

VEHICLE HAVING TIRES WITH REINFORCED SIDEWALLS

RELATED APPLICATIONS

This is a U.S. national stage under 35 USC §371 of application No. PCT/EP2008/065484, filed on Nov. 13, 2008.

This application claims the priority of French application Ser. No. 07/59030 filed Nov. 14, 2007, the entire content of which is hereby incorporated by reference.

FIELD OF THE INVENTION

The present invention relates to a two-wheeled vehicle such as a motorcycle equipped with two tires.

Although not limited to such an application, the invention will be more particularly described with reference to a motorcycle, or motorbike.

BACKGROUND OF THE INVENTION

The reinforcing armature or reinforcement of the tires, and notably of motorcycle tires, is at the present time, and more often than not, formed by stacking one or more plies, conventionally designated "carcass plies", "breaker strips", etc. This manner of designating the reinforcing armatures originates from the manufacturing process, consisting in producing a series of semi-finished products in the form of plies, provided with filament reinforcements, often longitudinal, which are thereafter assembled or stacked in order to form a tire blank. The plies are produced flat, with large dimensions, and are then cut according to the dimensions of a given product. The plies are also assembled, initially, substantially flat. The duly produced blank is then shaped to adopt the toroidal profile typical of tires. The so-called "finishing" semi-finished products are then applied to the blank, to obtain a product ready for vulcanization.

Such a "conventional" type method involves, in particular for the tire blank manufacturing phase, the use of an anchoring element (usually a bead wire), used to provide the anchorage or to secure the carcass armature in the area of the beads of the tire. Thus, for this type of method, a portion of all the plies forming the carcass armature (or of just some) is turned up around a bead wire arranged in the bead of the tire. In this way, an anchorage is created for the carcass armature in the bead.

The generalization in the industry of this type of conventional method, despite numerous variants in how to produce the plies and the assemblies, has led those skilled in the art to use a vocabulary modeled on the method; hence the generally accepted terminology, notably comprising the terms "plies", "carcass", "bead wire", "conformation" to designate the transition from a flat profile to a toroidal profile, etc.

There are now tires that do not strictly speaking comprise "plies" or "bead wires" according to the above definitions. For example, the document EP 0 582 196 describes tires manufactured without the use of semi-finished products in the form of plies. For example, the reinforcing elements of the different reinforcing structures are applied directly to the adjacent layers of rubbery mixtures, the whole being applied in successive layers to a toroidal core, the shape of which is used to directly obtain a profile matching the final profile of the tire during manufacture. Thus, in this case, the terms "semi-finished", "plies", and "bead wire" no longer apply. The basic products such as the rubbery mixtures and the reinforcing elements in the form of threads or filaments, are applied directly to the core. Since this core is toroidal in shape, it is no longer necessary to form the blank to change from a flat profile to a torus-shaped profile.

Moreover, the tires described in this document do not have the "conventional" carcass ply turn-up about a bead wire. This type of anchorage is replaced by an arrangement wherein circumferential threads are arranged adjacent to said sidewall reinforcing structure, the whole being embedded in an anchoring or linking rubbery mixture.

There are also methods of assembly on toroidal core that use semi-finished products that are specially adapted for rapid, effective and simple placement on a central core. Finally, it is also possible to use a mix comprising both certain semi-finished products to produce certain architectural aspects (such as plies, bead wires, etc.), whereas others are produced from the direct application of reinforcing mixtures and/or elements.

In the present document, in order to take account of the recent technological developments both in the manufacturing field and in product design, the conventional terms such as "plies", "bead wires", etc., are advantageously replaced by terms that are neutral or independent of the type of method used. Thus, the term "carcass-type reinforcement" or "sidewall reinforcement" is valid for designating the reinforcing elements of a carcass ply in the conventional method, and the corresponding reinforcing elements, generally applied at the sidewall level, of a tire produced according to a method without semi-finished products. The term "anchorage area", for its part, may designate either the "conventional" carcass ply turn-up about a bead wire of a conventional method, and the assembly formed by the circumferential reinforcing elements, the rubbery mixture and the adjacent sidewall reinforcement portions of a bottom area produced using a method with application to a toroidal core.

As in the case of all the other tires, there is a trend towards the radialization of tires for motorbikes, the architecture of such tires comprising a carcass armature formed by one or two plies of reinforcing elements forming with the circumferential direction an angle that can be between 65° and 90°, said carcass armature being radially topped by a crown armature formed at least by generally fabric reinforcing elements. However, there are still non-radial tires to which the invention also relates. The invention further relates to partially radial tires, that is to say tires whose reinforcing elements of the carcass armature are radial over at least a part of said carcass armature, for example in the part corresponding to the crown of the tire.

Many crown armature architectures have been proposed, depending on whether the tire will be intended for mounting at the front of the motorbike or for mounting at the rear. A first structure consists, for said crown armature, in employing only circumferential cables, and said structure is more particularly employed for the rear position. A second structure, directly inspired by the structures commonly employed in tires for private passenger vehicles, has been used to improve the resistance to wear, and consists in the use of at least two breaker strips of reinforcing elements parallel to one another in each ply but crossed from one ply to the next by forming with the circumferential direction acute angles, such tires being more particularly suited for the front of the motorbikes. Said two breaker strips can be radially topped by at least one ply of circumferential elements, generally obtained by helically winding a strip of at least one rubber-coated reinforcing element. The patent FR 2 561 588 thus describes such a crown armature, with at least one ply whose reinforcing elements form with the circumferential direction an angle that can vary between 0° and 8°, the modulus of elasticity of such elements being as high as at least 6000 N/mm², and, arranged between the carcass armature and the ply of circumferential elements, a damping layer mainly formed by two plies of elements crossed from one ply to the next, forming between them angles of between 60° and 90°, said crossed plies being formed by fabric reinforcing elements having a modulus of elasticity of at least 6000 N/mm².

The document EP 0 456 933, in order to confer on a motorbike tire excellent stability at high speed and an excellent ground contact property, teaches, for example, forming a crown armature with at least two plies: a first ply, radially closest to the carcass armature, consisting of ropes oriented with an angle of between 40° and 90° in relation to the circumferential direction and the second ply, radially closest to the tire tread, consisting of ropes helically wound in the circumferential direction.

The U.S. Pat. No. 5,301,730, with a view to enhancing the driveability of a tire for the rear position of a motorbike, proposes a crown armature consisting, from the radial carcass armature to the tire tread, of at least one ply of substantially circumferential elements and two plies of elements crossed from one ply to the next, forming with the circumferential direction an angle that can be between 35° and 55°, the ply of elements which are parallel to the circumferential direction being able to be formed by elements made of aromatic polyamide, and the plies of crossed elements of aliphatic polyamide.

The circumferential direction of the tire, or longitudinal direction, is the direction corresponding to the periphery of the tire and defined by the rolling direction of the tire.

A circumferential plane or cross-sectional circumferential plane is a plane perpendicular to the axis of rotation of the tire. The equatorial plane is the circumferential plane passing through the centre or crown of the tire tread.

A radial plane or mid-plane is a plane that contains the axis of rotation of the tire.

The axis of rotation of the tire is the axis about which it revolves in normal use.

The transversal or axial direction of the tire is parallel to the axis of rotation of the tire.

SUMMARY OF THE INVENTION

One object of the invention is to further improve the driving of a motorcycle and notably the capacity of the tires for motorcycles to transmit motive or braking forces, but without being detrimental to the other properties that are necessary to user satisfaction.

This object has been achieved according to one aspect of the invention by a vehicle of motorcycle type having two axle systems each equipped with a mounted assembly consisting of a wheel and a tire, each of the tires comprising at least one reinforcing structure of carcass type, formed by reinforcing elements, anchored on each side of the tire to a bead whose base is intended to be mounted on a rim seat, each bead extending radially outward through a sidewall, the sidewalls joining radially outward with a tire tread, said tires comprising, at least in a part of each sidewall, at least one additional layer of reinforcing elements that is axially adjacent to the carcass-type reinforcing structure, the reinforcing elements of the additional layer forming with the circumferential direction an angle of between 20° and 60°, the orientation of the reinforcing elements of the additional layer in a sidewall being symmetrical to the orientation of the reinforcing elements of the additional layer in the other sidewall in relation to the equatorial plane and in the tire fitted on the rear axle system, the angle formed by the plane comprising a reinforcing element of an additional layer with a radial plane comprising the radially inner end of said reinforcing element, being oriented in the direction of rotation of the mounted assembly corresponding to the forward movement of the vehicle and in the tire fitted on the front axle system, the angle formed by the plane comprising a reinforcing element of an additional layer with a radial plane comprising the radially inner end of said reinforcing element, is oriented in the direction opposite to the direction of rotation of the mounted assembly corresponding to the forward movement of the vehicle.

Within the meaning of the invention, two layers are adjacent when they are separated from one another by at most the calendering layers forming said layers or by topping layers coating the reinforcing elements. According to an embodiment of the invention, the distance measured from rope to rope, that is to say between the ropes of two adjacent layers, corresponding to the thickness of the rubbery calendering or topping mixtures, radially external to the cables of a first radially inner layer and radially internal to the ropes of the second radially outer layer is greater than or equal to 0.3 mm.

According to a preferred embodiment of the invention, the curvilinear abscissa of an additional layer of at least one of the tires on a mid-plane cross section of the tire is greater than 20 mm.

Also preferentially, the additional layer of at least one of the tires extends at least from the radially outer end of the anchoring area of the carcass-type reinforcing structure in a bead.

One advantageous embodiment of the invention provides for the additional layer of at least one of the tires to extend to at least one shoulder end.

Within the meaning of the invention, a shoulder end is defined, in the area of the shoulder of the tire, by the orthogonal projection on the surface of the carcass armature of the intersection of the tangents on the surfaces of an axially outer end of the tire tread (crown of the sculptures) on the one hand and of the radially outer end of a sidewall on the other hand.

The invention proposes, according to this embodiment of the invention, that the additional layer extend to at least one point of tangency of the curvilinear abscissa of the carcass-type reinforcing structure with a perpendicular to the axis of rotation.

The tests carried out on motorcycles according to the invention have shown that it makes it possible on the one hand to increase the driveability of the tire fitted on the rear axle system, that is to say the capacity of the tire to transmit a motive force, and on the other hand to increase the capacity to transmit a braking force with regard to the tire of the front axle system.

These tests have shown that a motorcycle fitted with a tire on its rear axle system according to the invention effectively makes it possible to increase the driveability of said tire provided that the orthogonal projection on a circumferential plane of the mean direction of a reinforcing element of the additional layer forms an angle with a radial plane comprising the radially inner end of said reinforcing element, said angle being oriented from the radial plane to said projection in the direction opposite to the direction of rotation of the mounted assembly corresponding to the forward movement of the vehicle.

Similarly, the tests have shown that a motorcycle fitted with a tire on its front axle system according to the invention effectively makes it possible to increase the braking capacity of the tire provided that the orthogonal projection on a circumferential plane of the mean direction of a reinforcing element of the additional layer forms an angle with a radial plane comprising the radially inner end of said reinforcing element, said angle being oriented from the radial plane to said projection in the direction of rotation of the mounted assembly corresponding to the forward movement of the vehicle.

A variant of the invention advantageously provides for the additional layer of at least one of the tires to extend under the tire tread.

According to a first embodiment of this variant of the invention, the tire comprising, under the tire tread, a crown reinforcing structure consisting of at least one layer of reinforcing elements called working layer, the additional layer extends to at least one axial end of the axially widest working crown layer.

According to a second embodiment of this variant of the invention, the tire comprising, under the tire tread, a crown reinforcing structure consisting of at least one layer of reinforcing elements called working layer, the additional layer extends to be radially superposed on at least a part of a working layer. The additional layers extending in each of the sidewalls then also form two half crown layers similar to working layers. These half-layers may be either additional layers or replace a working layer initially provided in the architecture of the tire. In the latter case, the half-layers corresponding to the additional layers are then, for example, associated with at least two other half-layers of crown reinforcing elements, which do not extend into the sidewalls of the tire, the reinforcing elements of two radially superposed half-layers being crossed relative to one another.

According to one embodiment of the invention whereby the carcass-type reinforcing structure of at least one of the tires comprises at least one ply of reinforcing elements having a turn-up about a bead wire, the radially inner end of at least additional layer is positioned axially between the ply of reinforcing elements and its turn-up. In this way, the coupling with the carcass ply is greater, the additional layer being directly in contact with the carcass ply, including in the turn-up area.

In the case of a tire comprising several layers forming the carcass-type reinforcing structure, at least one additional layer is advantageously placed axially between said layers forming the carcass-type reinforcing structure.

According to one or other of these embodiments of the invention, at least one additional layer of at least one of the tires is either placed axially inside the carcass-type reinforcing structure, or axially outside the carcass-type reinforcing structure.

In the case of an additional layer that extends under the tire tread and that is axially internal to the carcass-type reinforcing structure in the sidewall, the additional layer is advantageously radially external to the carcass-type reinforcing structure under the tire tread.

Such a tire is then advantageously produced according to a technique of the hard or toroidal core type that can be used simply to produce the superposition of layers in one direction over a part of their length and in another over the remainder of their length.

A first variant embodiment of the invention provides for at least one of the tires of the vehicle to comprise, in a part of each sidewall, a single additional layer. Such a variant notably offers an economic benefit compared to the case of several additional layers, notably in terms of material, as well as in terms of productivity since the number of elements put in place is lower.

A second variant of the invention provides for at least one of the tires of the vehicle to comprise, at least in a part of each sidewall, at least two additional layers, the reinforcing elements of the two additional layers being oriented in the same direction in relation to the circumferential direction. The tests have shown that such a production variant can make it possible to retain the benefits of the first variant in terms of torque transfers while making it possible to improve the rigidities of the tire in one or other of the radial or lateral directions.

Within the meaning of the invention, an orientation in the same direction of reinforcing elements in relation to the circumferential direction means that the angles formed by the direction of said reinforcing elements with the circumferential direction are of the same signs.

Advantageously according to this variant of the invention, two additional layers are adjacent to the carcass-type reinforcing structure at least in a part of each sidewall; in the case of a carcass armature having only one layer, one of the additional layers is axially inside the carcass layer and the other is axially outside said carcass layer. In the case of a carcass armature having a number of layers, the two complementary layers can be placed axially between two carcass layers.

According to one embodiment of the invention, with the tire comprises, under the tire tread, a crown reinforcing structure consisting of at least one layer of reinforcing elements called working layer, the crown reinforcing structure comprises at least two layers of reinforcing elements such that, from one layer to the next, the reinforcing elements form between them angles of between 20 and 160° and preferentially between 40 and 100°.

The tires fitted on the motorcycle according to the invention are advantageously radial-type tires. The reinforcing elements of the carcass-type reinforcing structure advantageously form with the circumferential direction an angle of between 65° and 90°.

A preferred embodiment of the invention provides for at least one of the tires to notably consist of a crown reinforcing structure that also comprises at least one layer of circumferential reinforcing elements; according to the invention, the layer of circumferential reinforcing elements consists of at least one reinforcing element oriented according to an angle formed with the longitudinal direction that is less than 5°.

The presence of a layer of circumferential reinforcing elements is notably preferable for the production of a tire intended for use at the rear of a motorcycle.

One advantageous embodiment of the invention provides for the layer of circumferential reinforcing elements to be positioned at least partially on a working layer and, for example, on the additional layers when the latter extend under the tire tread. When the layer of circumferential reinforcing elements is produced on two working layers and placed directly under the tire tread, it can notably help to improve the stability at high speed.

The layer of circumferential reinforcing elements can thus be produced directly under the tire tread to form, in addition to its first function, a layer protecting the carcass and other layers of the crown reinforcing structure against possible mechanical attack.

The layer of circumferential reinforcing elements can even be produced between the working layers or between a working layer and the additional layers when the latter extend under the tire tread, notably in the interests of economy, the quantity of material and fitting time thus being reduced.

Another advantageous embodiment of the invention provides for the layer of circumferential reinforcing elements to be positioned at least partly radially inside the radially inner working layer, even radially inside the additional layers when the latter extend under the tire tread. According to this embodiment, the layer of circumferential reinforcing elements is produced radially inside the working layers and can, notably, make it possible to improve the roadholding and driveability of the tire.

Another variant of the invention provides for at least one layer of circumferential reinforcing elements to be positioned at least partially radially inside the carcass-type reinforcing structure. This variant embodiment can even reproduce the various positionings stated previously in relation to the working layers and/or in relation to the additional layers when the latter extend under the tire tread. The carcass can thus cover the complete crown reinforcing structure. Preferentially, the invention provides for at least one crown reinforcing layer, or the additional layers when they extend under the tire tread, to be placed between the carcass and the tire tread to provide protection for the carcass.

It should be noted that a tire fitted on a motorcycle according to the invention, notably when at least a part of the crown reinforcing structure is produced radially inside the carcass structure, is advantageously produced according to a manufacturing technique of the type that uses a hard core or rigid form.

One advantageous embodiment of the invention provides for the carcass-type reinforcing structure of at least one of the tires to consist of two half-layers extending, for example, from the shoulders to the beads. Depending on the nature, the quantity and the arrangement of the crown reinforcing elements, the invention effectively provides for the elimination of the carcass structure in at least a part of the area located under the tire tread of at least one of the tires. Such a carcass structure can be produced according to the teachings of the document EP-A-0 844 106. The previously stated relative positions of the different layers of the crown reinforcing structure are all compatible with such a carcass structure.

According to an embodiment of the invention, the reinforcing elements of the additional layers have a modulus of elasticity greater than 6000 N/mm$^2$ and are preferentially made of fabric material, notably to limit the increase in the weight of the tire.

According to a preferred embodiment of the invention, the reinforcing elements of the working layers are made of fabric material.

Also preferentially, the reinforcing elements of the layer of circumferential reinforcing elements are metallic and/or fabric and/or made of glass. The invention notably provides for the use of reinforcing elements of different kinds in one and the same layer of circumferential reinforcing elements.

Also preferentially, the reinforcing elements of the layer of circumferential reinforcing elements have a modulus of elasticity greater than 6000 N/mm$^2$.

BRIEF DESCRIPTION OF THE DRAWINGS

Other details and advantageous features of the invention will become apparent hereinbelow from the description of the exemplary embodiments of the invention with reference to FIGS. 1 to 4 which represent.

DETAILED DESCRIPTION OF THE DRAWINGS

FIGS. 1 to 4 are not shown to scale to simplify their understanding.

Figure 1:
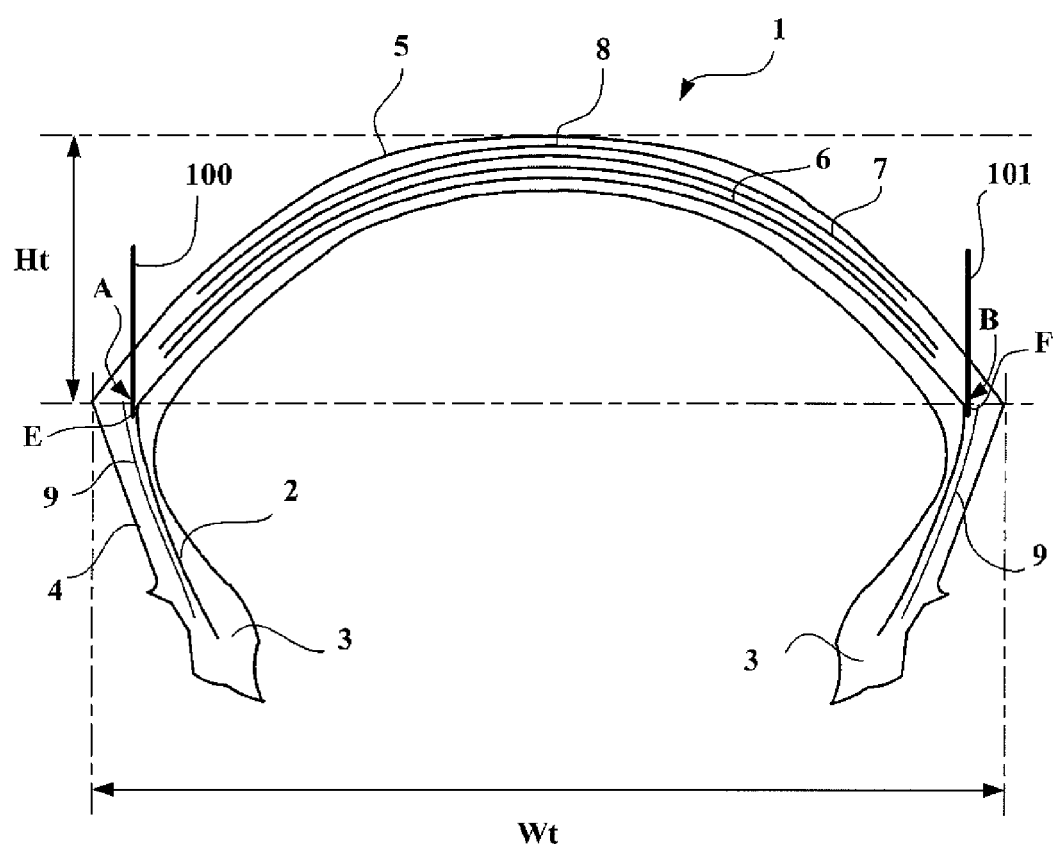
FIG. 1, a cross-sectional view of a diagram of a tire intended for a motorbike according to the invention, FIG. 2, a schematic representation of a tire intended for the rear axle system of a motorbike, FIG. 3, a schematic representation of a tire intended for the front axle system of a motorbike, FIG. 4, a schematic representation of a motorcycle according to the invention.

FIG. 1 represents a tire 1 comprising a carcass armature consisting of a single layer 2 comprising fabric-type reinforcing elements. The layer 2 consists of reinforcing elements arranged radially. The radial positioning of the reinforcing elements is defined by the lay angle of said reinforcing elements; a radial arrangement corresponds to a lay angle of said elements in relation to the longitudinal direction of the tire of between 65° and 90°.

Said carcass layer 2 is anchored on each side of the tire 1 in a bead 3 whose base is intended for mounting on a rim seat. The anchoring of the carcass layer 2 is not diagrammatically represented in the figures; it can be, for example, a turn-up about a bead wire or else an arrangement wherein circumferential threads are arranged adjacent to said carcass layer 2, the whole being embedded in a rubbery anchoring or linking mixture. Each bead 3 is extended radially outward by a sidewall 4, said sidewall 4 joining radially outward with the tire tread 5. The duly formed tire 1 has a curvature value greater than 0.15 and preferentially greater than 0.3. The curvature value is defined by the ratio Ht/Wt, that is to say by the ratio of the height of the tire tread to the maximum width of the tread of the tire. The curvature value will advantageously be between 0.25 and 0.5 for a tire intended for mounting on the front of a motorcycle and it will advantageously be between 0.2 and 0.5 for a tire intended for mounting at the rear.

Between the carcass and the tire tread there is placed a crown armature consisting in the present case of two working layers 6, 7 and a layer of circumferential reinforcing elements 8. The layer of circumferential reinforcing elements is, in FIG. 1, the radially outer part of the crown armature, and the two working layers 6, 7 are inserted between the carcass layer 2 and the layer of circumferential reinforcing elements 8. The layer of circumferential reinforcing elements advantageously consists of a single thread wound to form an angle with the longitudinal direction that is roughly equal to 0°. The layer of circumferential reinforcing elements can also be produced by simultaneously winding a number of bare threads or threads in the form of strips when they are embedded in the rubber.

The working layers 6, 7 consist of fabric reinforcements. The layer of circumferential reinforcing elements 8 consists of metallic reinforcements.

According to the invention, the tire also comprises in each of the sidewalls 4 additional layers 9 that extend from a shoulder end E, F to the anchoring area of the carcass layer 2 in the bead 3. In the case of a tire for motorcycle as represented in FIG. 1, the radial position of a shoulder end E, F corresponds to the point of tangency A, B of the curvilinear abscissa of the carcass layer 2 with a perpendicular to the axis of rotation 100, 101.

The additional layers 9 consist of aramid-type reinforcements.

Figure 2:
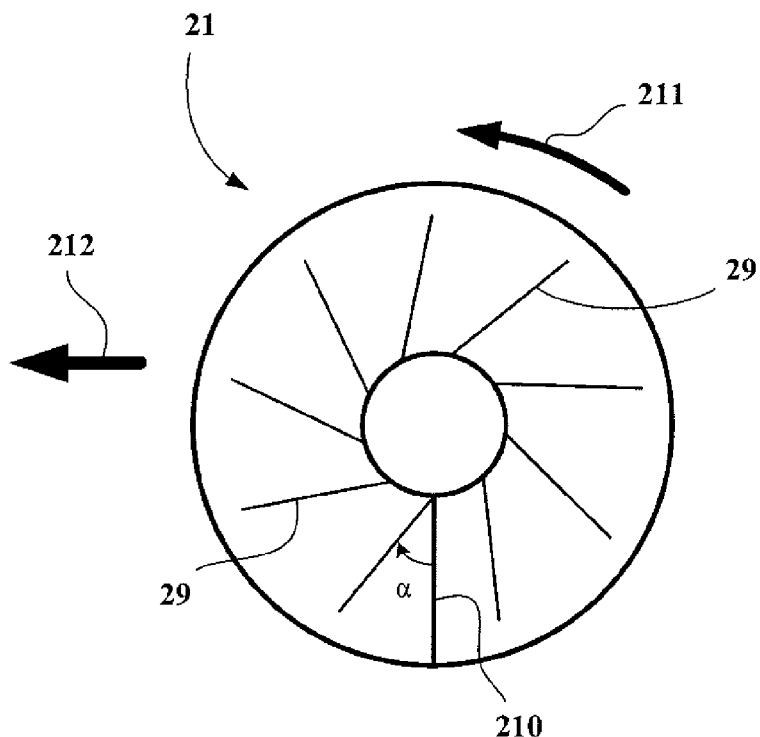

FIG. 2 illustrates a schematic view in orthogonal projection on a circumferential plane of a first variant embodiment according to the invention of a tire 21 intended to equip the rear axle system of a motorbike, and in which are represented the reinforcing elements 29 of an additional layer, such as that described with reference to FIG. 1.

In FIG. 2, the average direction of a reinforcing element 29 of the additional layer forms an angle α equal to 45° with a radial plane comprising the radially inner end of said reinforcing element, said angle α being oriented from the radial plane 210 to the average direction of the reinforcing element 29 in the direction opposite to the direction of rotation of the mounted assembly, indicated by the arrow 211, corresponding to the forward movement of the vehicle, indicated by the arrow 212.

A tire 21 intended to equip the rear axle system of a motorbike such as that represented in the figure improves the transmission of the motive forces.

Figure 3:
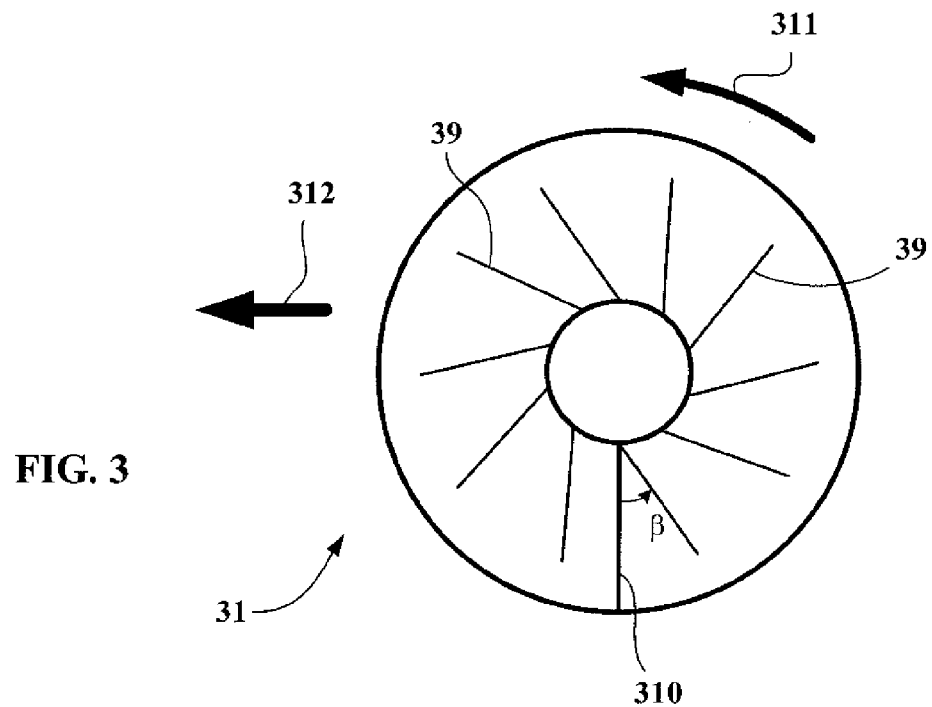

FIG. 3 illustrates a schematic view in orthogonal projection on a circumferential plane of a second variant embodiment according to the invention of a tire 31 intended to equip the front axle system of a motorbike, and in which are represented the reinforcing elements 39 of an additional layer, such as that described with reference to FIG. 1.

In FIG. 3, the average direction of a reinforcing element 39 of the additional layer forms an angle β equal to 45° with a radial plane comprising the radially inner end of said reinforcing element, said angle β being oriented from the radial plane 310 to the average direction of the reinforcing element 39 in the direction of rotation of the mounted assembly, indicated by the arrow 311, corresponding to the forward movement of the vehicle, indicated by the arrow 312.

A tire 31 intended to equip the front axle system of a motorbike such as that represented in FIG. 3 improves the transmission of the braking forces.

According to one or other of the embodiments represented in FIGS. 2 and 3, the production of the additional layers 9 according to the invention can conform to the representation of FIG. 1. According to other embodiments of the invention, the additional layers can be placed axially inside the carcass-type reinforcing structure. In the case of a carcass-type reinforcing structure consisting of two carcass plies, the additional layers can, for example, even be placed axially between the carcass plies.

The additional layers according to the invention can also extend under the tire tread. According to these types of embodiment, the additional layers can, for example, be axially inside the carcass-type reinforcing structure in the sidewalls and radially outside said carcass-type reinforcing structure under the tire tread.

Regarding the implementation of the latter type of embodiment of a tire according to the invention, the latter is advantageously obtained by manufacture of the type that uses a hard core.

Figure 4:
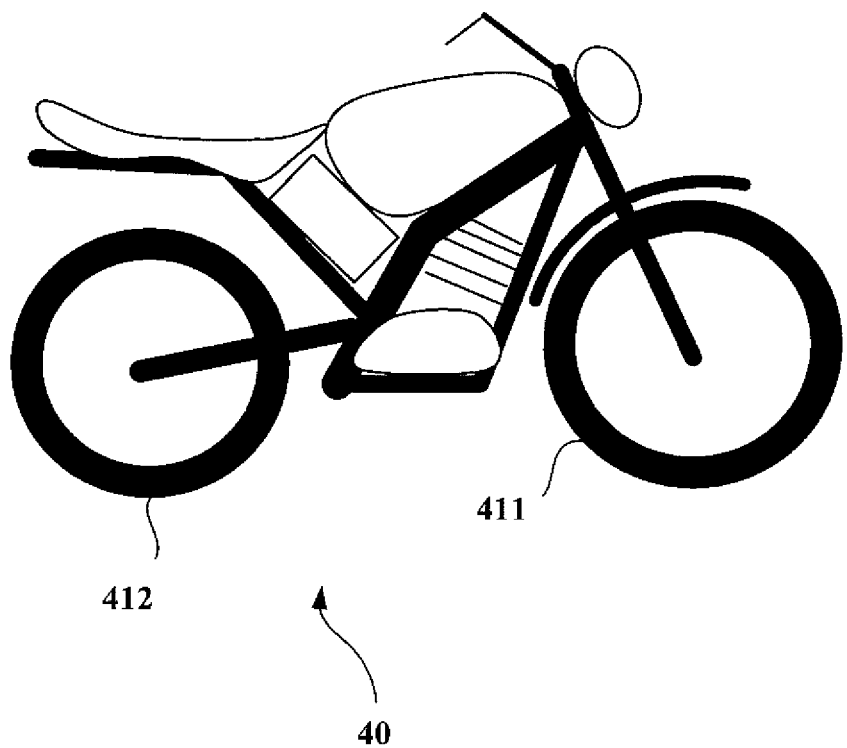

FIG. 4 represents a schematic view of a motorcycle 40 according to the invention comprising two tires 411, 412. According to the invention, the front tire 411, which is only stressed to transmit braking forces, conforms to that described in FIG. 3 and the rear tire, which is mainly involved in transmitting motive forces, conforms to that described in FIG. 2.

Rolling tests were carried out on a circuit with a motorcycle of the type of that illustrated in FIG. 4. Subjective analyses made by a number of riders have shown a notable improvement both in driveability and in braking, and notably in the

The invention claimed is:

1. A vehicle of motorcycle type having two axle systems each equipped with a mounted assembly consisting of a wheel and a tire, each of the tires comprising at least one reinforcing structure of carcass type, formed by reinforcing elements, anchored on each side of the tire to a bead, each bead extending radially outward through a sidewall, the sidewalls joining radially outward with a tire tread, wherein each of the tires comprises, at least in a part of each sidewall, at least one additional layer of reinforcing elements that is axially adjacent to the carcass-type reinforcing structure, wherein the reinforcing elements of the additional layer form, with the circumferential direction, an angle of between 20° and 60°, wherein the orientation of the reinforcing elements of the additional layer in a sidewall is symmetrical to the orientation of the reinforcing elements of the additional layer in the other sidewall in relation to the equatorial plane, wherein, the angle formed by the plane comprising a reinforcing element of an additional layer of the tire fitted on the rear axle system with a radial plane comprising the radially inner end of said reinforcing element, is oriented in the direction of rotation of the mounted assembly corresponding to the forward movement of the vehicle, and wherein the angle formed by the plane comprising a reinforcing element of an additional layer of the tire fitted on the front axle system with a radial plane comprising the radially inner end of said reinforcing element, is oriented in the direction opposite to the direction of rotation of the mounted assembly corresponding to the forward movement of the vehicle.

2. The vehicle according to claim 1, wherein the additional layer of at least one of the tires extends at least from the radially outer end of the anchoring area of the carcass-type reinforcing structure in a bead.

3. The vehicle according to claim 1, wherein the additional layer of at least one of the tires extends to at least one shoulder end.

4. The vehicle according to claim 1, wherein the additional layer of at least one of the tires extends under the tire tread.

5. The vehicle according to claim 3, each of the tires comprising, under the tire tread, a crown reinforcing structure consisting of at least one layer of reinforcing elements called working layer, wherein the additional layer of at least one of the tires extends to at least one axial end of the axially widest working crown layer.

6. The vehicle according to claim 1, the carcass-type reinforcing structure of at least one of the tires comprising at least one ply of reinforcing elements having a turn-up about a bead wire, wherein the radially inner end of at least one additional layer is positioned axially between the ply of reinforcing elements and its turn-up.

7. The vehicle according to claim 1, wherein at least one of the tires comprises, in a part of each sidewall, a single additional layer.

8. The vehicle according to claim 1, wherein at least one of the tires comprises at least two additional layers and wherein the reinforcing elements of the two additional layers are oriented in the same direction in relation to the circumferential direction.

9. The vehicle according to claim 1, each of the tires comprising, under the tire tread, a crown reinforcing structure consisting of at least one layer of reinforcing elements called working layer, wherein the crown reinforcing structure of at least one of the tires comprises at least two layers of reinforcing elements and in that from one layer to the next, the reinforcing elements form between them angles of between 20 and 160°.

10. The vehicle according to claim 1, wherein the reinforcing elements of the carcass-type reinforcing structure of at least one of the tires form with the circumferential direction an angle of between 65° and 90°.

11. The vehicle according to claim 1, wherein the carcass-type reinforcing structure of at least one of the tires is produced from two half-layers.

12. The vehicle according to claim 1, wherein the reinforcing elements of the additional layers of at least one of the tires have a modulus of elasticity greater than 6000 N/mm$^2$.

* * * * *